(12) United States Patent
Wetterlin et al.

(10) Patent No.: US 6,687,565 B2
(45) Date of Patent: Feb. 3, 2004

(54) KEY IDENTIFICATION CODE AND MANUFACTURING METHOD

(75) Inventors: Brad Wetterlin, Lakeville, MN (US); John S. Titus, Prior Lake, MN (US)

(73) Assignee: Machine Magic, LLC, Minnetonka, MN (US)

( * ) Notice: Subject to any disclaimer, the term of this patent is extended or adjusted under 35 U.S.C. 154(b) by 216 days.

(21) Appl. No.: 09/872,749

(22) Filed: Jun. 1, 2001

(65) Prior Publication Data

US 2002/0022901 A1 Feb. 21, 2002

Related U.S. Application Data

(60) Provisional application No. 60/209,044, filed on Jun. 2, 2000.

(51) Int. Cl.[7] .............................. G06F 19/00; B23C 1/16
(52) U.S. Cl. ........................................ 700/161; 409/81
(58) Field of Search ........................ 700/116, 161, 700/183; 409/81

(56) References Cited

U.S. PATENT DOCUMENTS

| | | | | |
|---|---|---|---|---|
| 4,300,042 A | * | 11/1981 | Oldenkamp et al. | 235/449 |
| 5,617,323 A | * | 4/1997 | Stansberry et al. | 700/161 |
| 5,676,504 A | * | 10/1997 | Mueller et al. | 409/83 |
| 5,711,643 A | * | 1/1998 | Parr et al. | 409/83 |
| 5,908,273 A | | 6/1999 | Titus et al. | |
| 6,065,911 A | * | 5/2000 | Almblad et al. | 409/83 |
| 6,152,662 A | | 11/2000 | Titus et al. | |
| 6,175,638 B1 | * | 1/2001 | Yanovsky | 382/100 |
| 6,243,960 B1 | * | 6/2001 | Andrews et al. | 33/507 |
| 6,406,227 B1 | | 6/2002 | Titus et al. | |

OTHER PUBLICATIONS

Application 09/514,503–"Key Preform for Making a Key".

* cited by examiner

*Primary Examiner*—Leo Picard
*Assistant Examiner*—Elliot Frank
(74) *Attorney, Agent, or Firm*—Altera Law Group, LLC

(57) ABSTRACT

After making measurements of a key, the measurements are converted into a compact format which can be read back at a later date or at a different location by apparatus capable of accurately reproducing the original key. The data may be stored on, for example, a sticker, paper strip, or magnetic swipe card. When the duplicate key is required, the data are read from the storage medium and transmitted to a suitable key duplication device to produce a reproduction key.

36 Claims, 5 Drawing Sheets

KEY IDENTIFICATION CODE AND MANUFACTURING METHOD

RELATED APPLICATIONS

This application claims priority from Provisional U.S. Patent Application Ser. No. 60/209,044, filed on Jun. 2, 2000, and which is incorporated herein by reference.

FIELD OF INVENTION

The present invention is directed generally to a method of describing and/or recording key geometry for the purpose of duplicating the key at a later date or different location without requiring the original key. The invention is also directed to a method of manufacturing a key from a preform that does not have a pre-cut keyway.

BACKGROUND

When making a duplicate key, it is currently necessary to have the original key present at the time of duplication. The person requiring duplicate keys may make several copies of the same key or set of keys to store in a safe place, or to give to neighbors, friends or family for special situations. This practice generates a large number of keys that are not generally needed or used. In addition, the duplicate keys are not always readily available, as might be the case with a vacation home—the duplicate keys may be hundreds of miles away. Without the keys from which to make a copy, there is currently no method to reproduce the keys.

SUMMARY OF THE INVENTION

In view of the problems highlighted in the previous section, there is a need for a method that sufficiently describes a key geometry such that it is possible to accurately produce the key on demand, without requiring the presence of the original key. This eliminates the need to store a large number of keys for an indefinite period of time.

Generally, the present invention relates to a method of converting data from the measurements of a key into a relatively compact format which can then be read back at a later date and/or location by apparatus capable of accurately reproducing the original key. The storage of the data is in a relatively compact format for simple storage on a sticker, paper strip, or magnetic swipe card, for example, which could easily be stored in a wallet or purse. If a duplicate key is required, the data can be read from the storage medium and transmitted to a suitable key duplication device to produce a reproduction.

In another embodiment of the invention, a key may be manufactured using a machine that is arranged to cut the keyway and key code for the key. The keyway and the keycode for the key are selected. The operator then enters instructions to the machine, for example via a keyboard, that direct the machine to cut the selected keyway and key code. In this manner, a new key, having a unique combination of keycode and keyway may be manufactured. This method may also be used for cutting a key to duplicate an original key, so long as the key code and keyway of the original key are known.

The above summary of the present invention is not intended to describe each illustrated embodiment or every implementation of the present invention. The figures and the detailed description, which follow more particularly, exemplify these embodiments.

BRIEF DESCRIPTION OF THE DRAWINGS

The invention may be more completely understood in consideration of the following detailed description of various embodiments of the invention in connection with the accompanying drawings, in which.

Figure 1B:
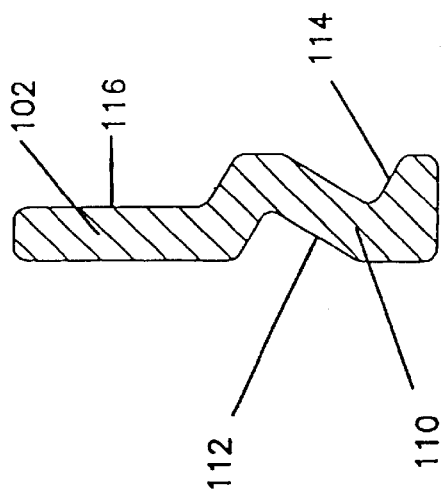
FIG. 1B is a cross sectional view of the key taken through the section 1B—1B shown in FIG. 1A.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is directed to a method related to key manufacturing that provides a significant time benefit by providing relevant key information to the key manufacturing machine. One embodiment of a machine that can be used for manufacturing a key is described in U.S. Pat. No. 5,908,273, incorporated herein by reference. The present invention uses only some of the features of the key manufacturing machine disclosed in U.S. Pat. No. 5,908,273. The machine is able to cut both the keyway and the keycode on a key, and so many different types of keys may be cut from the same type of blank or a key preform.

One embodiment of the present invention provides for the key duplicated in a key duplicating machine to be provided with a unique associated number which is retained by the user. The unique number may be referred to as a key identification code (KIC). The KIC uniquely distinguishes the keyway and key code of the original, or target, key to be duplicated. Thus, the same key may be duplicated at a later date by entering the KIC into the key manufacturing machine using different types of input interfaces, such as a magnetic card reader, a keyboard and the like. Therefore, unlike conventional key duplication, this invention obviates the need for re-measuring the original key when a second duplicate key is to be manufactured. This results in substantial time savings as the KIC contains relevant parameters for the key duplication process thus causing the machine to duplicate the key faster.

Figure 1A:
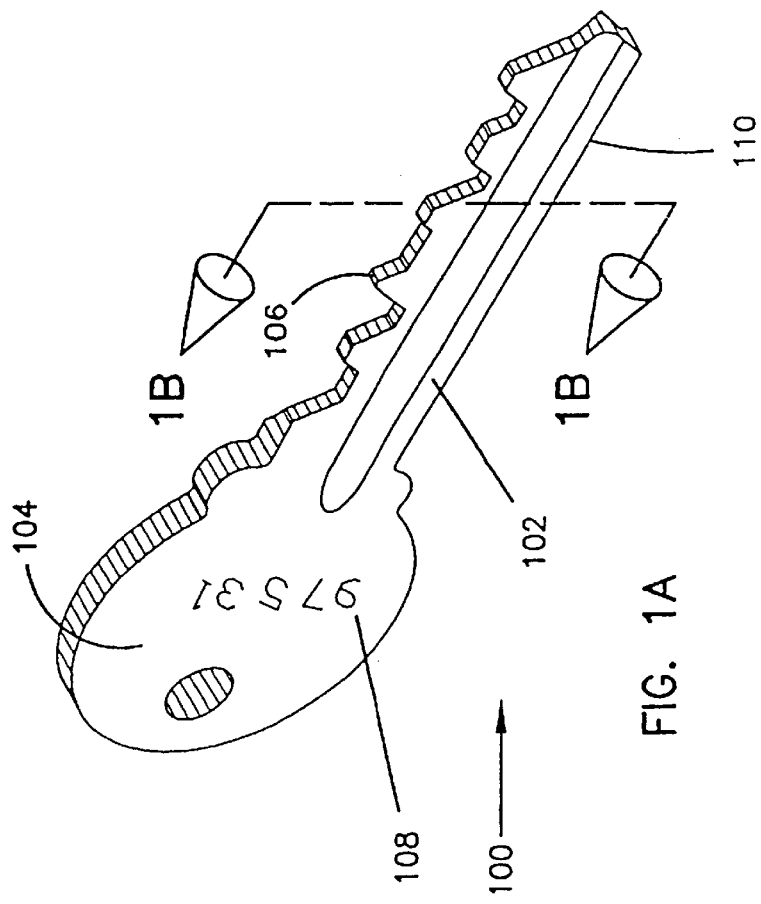
FIG. 1A is a perspective view of the key.

FIG. 1A illustrates the various component parts of a key 100. The key shaft 102 extends from the key bow 104. The key bow 104 is the portion typically held by the user when using the key. The shaft 102 has a key code 106 along one edge. The bow 104 may be provided with a numerical code 108 that corresponds to the key code 106.

The cross section of the shaft 102 has a particular shape, known as the keyway 110. The profile of the keyway 110 is illustrated in FIG. 1B, which shows a cross section 1B—1B through the shaft 102. The keyway 110 illustrated includes a notch 112 on a first side of the shaft 102 and another notch 114 and land 116 on the second side of the shaft 102. The notches 112 and 114 and land 116 run the length of the shaft and mate with the aperture of the lock when the key 100 is inserted.

It will be appreciated that the key shown in FIGS. 1A and 1B is only an example of a key and is not intended to limit the scope of the invention in any way. For example, the key 100 may be a double-sided key, in which case the key code is found on opposite edges of the shaft. Generally, although not always the case, the same key code is provided on each edge of a double-sided key so that it may be inserted into the lock in either orientation. Additionally, it will be appreciated that keys come with many different keyway profiles.

Figure 2:
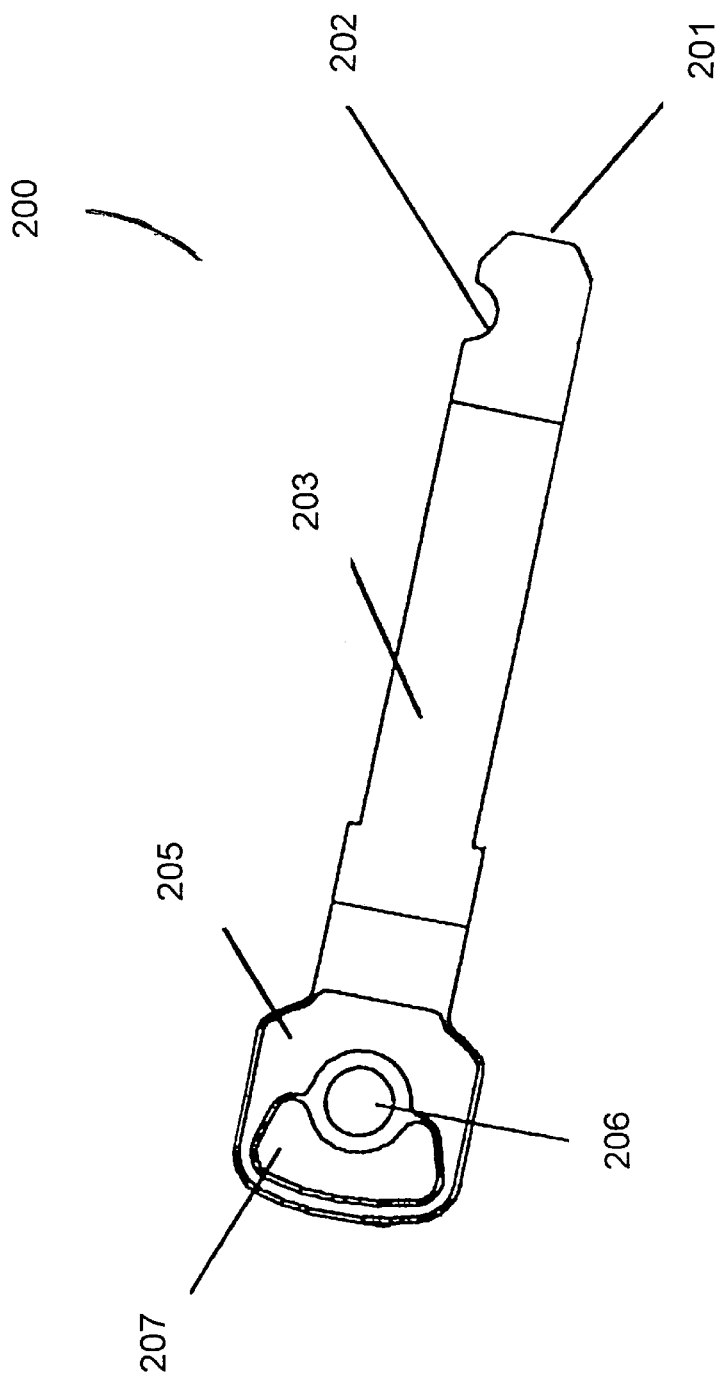
FIG. 2 is a view of a preform.

When the duplicate key is cut from a key manufacturing machine that cuts both keyways and key codes, the duplicate may be cut from a key preform, or from a blank piece of material. FIG. 2 illustrates the various component parts of a preform 200. The preform shaft 203 extends from the bow 205. This is the portion of the key that the user holds after the preform is converted into a key. The bow 205 may have a hole 206 that is used to position the preform 200 in the key manufacturing machine. The bow 205 may include an embossed portion 207 that is used as an identifier, for example for the company that manufactures the key manufacturing machine. There may also be a notch 202, which identifies the orientation of the preform 200. Finally, the tip 201 of the preform 200 may be tapered to permit the tip 201 to be accommodated in a clamping mechanism of the key manufacturing machine. Other embodiments of key preform are disclosed in U.S. patent application Ser. No. 09/514,503, incorporated herein by reference. The key may also be duplicated in a blank piece of material, which is typically rectangular, but may be of any suitable shape.

Figure 3:
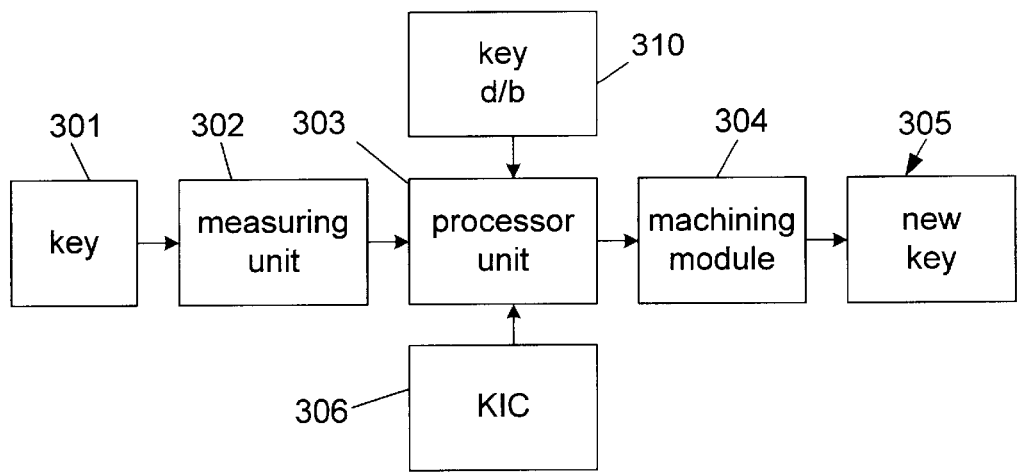
FIG. 3 lists the process steps for converting the key information into a key identification code.

FIG. 3 illustrates a block schematic diagram of an embodiment of a system for the apparatus that may be used to measure the information about the target key. In this particular embodiment 301 represents the target key, which is to be duplicated. In module 302 the key is scanned for its dimensions and for its keyway and its key code information. Different embodiments of how to scan the key are discussed in U.S. Pat. Nos. 5,908,273, 6,152,622 and 6,406,227, all of which are incorporated herein by reference. The key measurement information is then processed in module 303 and a unique KIC is generated. This KIC contains information about the key and the process parameters. The KIC may be given to the customer as printed alphanumeric output (hard copy) in module 306. FIG. 3 also shows that apart from generating the KIC, the key manufacturing machine may also perform its usual task of machining a preform in the machining module 304 to produce a duplicate key 305.

In one particular embodiment, the processing unit 303 may compare the measured keyway and/or key code with standard keyways and/or key codes stored on a key database 310 and determine which standard keyway and/or key code most closely matches those of the target key 301. Once the matched keyway and/or key code has been established, the processing unit 303 may then generate a KIC that relates to the matched standard keyway and/or key code in the key database 310.

Figure 4:
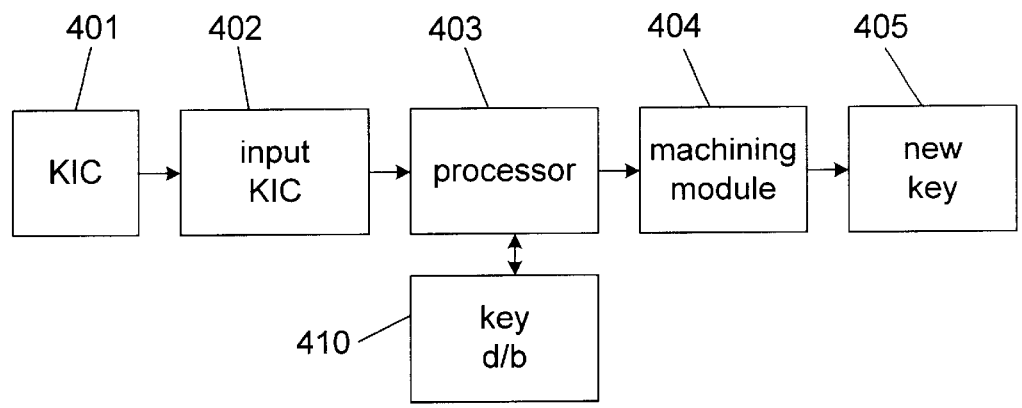
FIG. 4 lists the process steps of using the manually entered key identification code to generate the duplicate key.

FIG. 4 illustrates a block schematic of an embodiment of a system for the apparatus that may be employed for using the KIC to generate a duplicate key. In this particular embodiment, the KIC 401 is contained in a hard copy that is in the user's possession. An input interface 402 may be used to receive the KIC. For example, the KIC may be a code that the user inputs to the interface 402 manually via a keyboard, mouse, joystick, or the like. The processor 403 receives the KIC and, if necessary, converts the KIC into machining instructions that are transmitted to the machining module 404. The machining module 404 produces the duplicate key 405 in accordance with the machining instructions received from the processor 403.

If the KIC contains information that relates to standard keyway and/or key code information stored in a key database 410, the processor 403 may, upon receiving the KIC, interrogate the key database 410 to retrieve information on the key to be duplicated. The information may comprise measurements of the keyway and or key code to be machined, control data for controlling the machining module 404 to machine the duplicate key, or some other information that may be used by the processor and/or the machining module 404 to identify the physical parameters of the keyway and/or key code to be machined.

Figure 5:
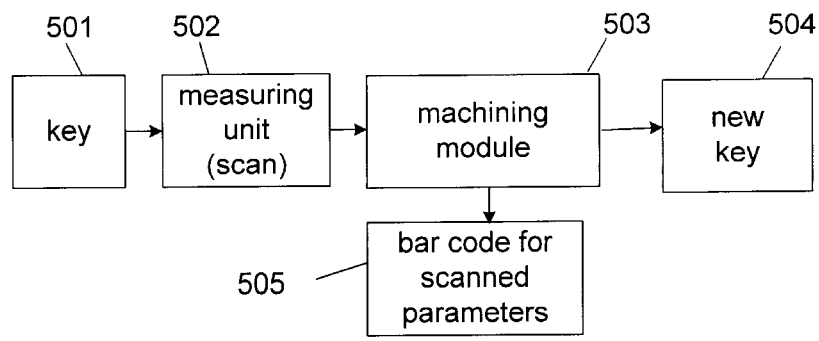
FIG. 5 lists the process steps of converting the key information into a bar code containing the key identification code.

FIG. 5 illustrates a block schematic of an embodiment of a system for the apparatus that may be used to measure the information about the target key. In this particular embodiment the target key 501, which is to be duplicated, is measured by the measuring unit 502. The measuring unit 502 measures the key code and the keyway of the target key. The measurement data produced by the measuring unit are used to generate a bar code using the module 505. The bar code stores information about the key type, including the keyway and key code. Also shown is a machining module 503, which may be used to machine a duplicate key 504. The customer may be provided with a duplicate key 504, a bar code with the KIC of the target key, or with both the KIC and a duplicate key 504. The bar code may be printed on a plastic card, a metal tag or the like, which is given to the customer.

Figure 6:
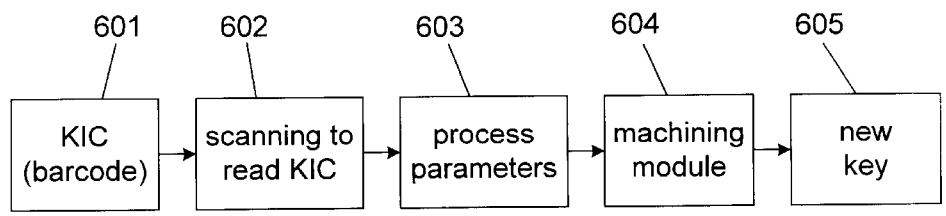
FIG. 6 lists the process steps of using the key identification bar code to generate the duplicate key.

FIG. 6 illustrates a block schematic of an embodiment of a system for the apparatus that may be used for using the bar code KIC to generate a duplicate key 605. In this embodiment the bar-code 601, which may be in the form of a card or tag with printed bar code information, is fed to a scanner 602 which reads and interprets the bar code KIC information. The scanner 602 may be, for example, an optical scanner. The processor 603 receives the scanned information from the scanner 602, and typically converts the scanned information into process parameters, or machine instructions, that are transmitted to the machining module 604. The machining module 604 produces a key 604 using the process parameters received from the processor 603.

Figure 7:
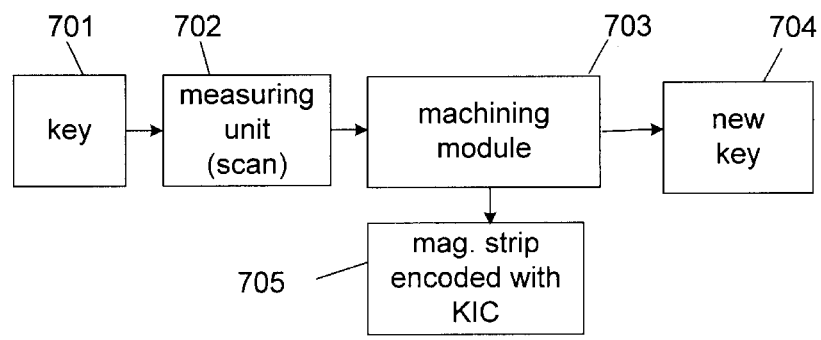
FIG. 7 lists the process steps of converting the key information into a key identification on a magnetic strip.

FIG. 7 illustrates a block schematic of an embodiment of a system for the apparatus that may be used to determine the information about the target key. In this particular embodiment, the target key 701 is measured by the measurement unit 702 to determine the dimensions and the key code and keyway for the target key. The measurement unit generates a KIC appropriate for the target key 701. The KIC is encoded onto a magnetic storage medium 705, for example the magnetic strip of a plastic card. The KIC may constitute the measurement information obtained by the measurement unit, or may be a processed form of information that represents the keyway and keycode of the target key 701. The measurement unit 702 may also pass information on to the machining module 703 so that the machining module 703 generates a key 704.

Figure 8:
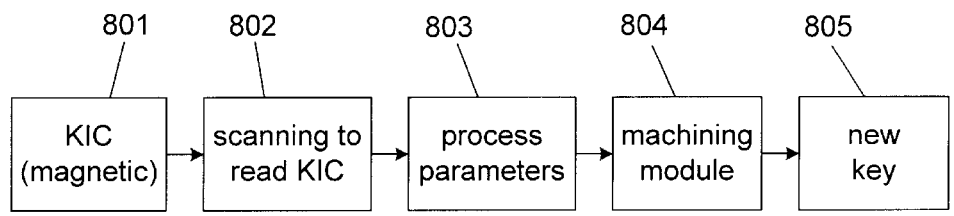
FIG. 8 lists the process steps of using the key identification code on a magnetic strip to generate the duplicate key.

FIG. 8 illustrates a block schematic of an embodiment of a system for the apparatus that may be used for using the magnetically stored KIC for generating a duplicate key 805.

In this embodiment, the KIC on the magnetic storage medium 801, for example in the form of a swipe card, is read by a magnetic data reader 802. The information from the magnetic data reader 802 is transmitted to the processor 803 which may read and interpret the coded information. The processor 803 converts the scanned information into process parameters, or machine instructions, that are transmitted to the machining module 804. The machining module 804 produces a key 804 using the process parameters received from the processor 803.

It will be appreciated that the KIC need not only be generated through measurement of the target key. The KIC may also be generated from other information received from the key, for example as is discussed in U.S. Pat. No. 6,152,622. One particular illustration of receiving information from the key is to receive information regarding the key code and the keyway from a transponder attached to the key.

The KIC may be produced in one of several different formats. For example, the KIC may include the measurement data produced by the measuring unit. Accordingly, the processor that receives such a KIC processes the measurement data to produce machine control instructions for the machining module that is to cut the new key.

The measuring units 502 and 702 may compare the measurements of the target key with a database of known key codes and keyways and then generate a KIC that represents the key code and keyway in the database that respectively most closely match with the measured key code and keyway. In this type of code format, the processor 603 and 803 that receives the KIC uses the code to generate machine control instructions for the machining module. The processor 603 and 803 may obtain the control instructions, or other information related to generating the keyway and/or key code from the key database.

In another example, the measuring unit may generate machining instructions from the measurement data and present the machining instructions as the KIC. In such a format, the processor that receives the KIC may simply transfer the machining instructions to the machining module for cutting the new key.

In another example, the measuring unit may direct information on the measured key to a central database, and present the user with a KIC that represents the address in the central database where the information on the key is stored. Accordingly, when the user wishes to have a new key manufactured using the KIC, the processor that receives the KIC retrieves the key information from the central database using the address represented by the KIC. The information stored on the central database may be in any suitable format. The information stored on the central database may represent the measurements of the key, may represent coded values for the measured key code and keyway, may represent machining instructions, or may be in any other suitable format that permits the processor and machining module to cut a key of the appropriate shape and size.

The invention described above may also be used for cutting new keys that have no target from which to duplicate. For example, a user may provide the KIC to a key manufacturing machine processor, where the KIC was created by the user who wished to make a key having a particular keyway and key code. A system that uses a database of keycodes and keyways is particularly advantageous for this approach. Consider, for example, a database that stores 10,000 key codes, numbered 1–10,000, and stores 26 keyways, identified with letters A–Z. The user may select any one of the 10,000 key codes and any one of the 26 keyways for the key he or she wishes to be made. Thus, inputting a selection "9568,F" selects keycode number 9568 and keyway F. The machining instructions for the selected keyway and key code are downloaded from the database to the machining module which then cuts a new key with keyway F and keycode 9568.

A database may be used to translate information on keyways and key codes obtained from a manufacturer to generate a KIC for a key product. For example, information on standard keyways and key codes, such as keyway and key code dimensions, may be stored on a key data base so that a measuring unit can compare measured keyway and key code data with standard data. The comparison may be used to yield a code for the keyway and key code that is used as the KIC. The manufacturer's key data may also be translated into instructions for machining the standard keyway and key codes in a preform or material blank, and the instructions stored on the key database. Therefore, when a particular KIC is detected by a machining unit, the machining unit may be able to identify the relevant standard keyway and key code and retrieve the machining instructions from the key database.

It will be appreciated that other approaches to providing instructions to the key manufacturing machine may be used. For example, a user may supply machining instructions to a key manufacturing machine, or measurements of a desired key. The processor of the key manufacturing machine may then convert whatever information is supplied by the user into machining instructions for controlling the machining module. An important feature of the invention is that a user may input a set of instructions to the key manufacturing machine, and the machine is capable of manufacturing a complete key from a blank preform, with a keyway and key code, in accordance with the instructions received from the user.

While various examples were provided above, the present invention is not limited to the specifics of the examples. The KIC may be presented to the user in other forms. For example, the KIC may be input from the measurement unit to the user's hand held computer, thus obviating the need for a hard copy of the KIC. As noted above, the present invention is applicable to customers who may want to save time by bringing the KIC with them when they get their keys duplicated. It may be applicable to a customer wanting the same key in a location different from the one where it was originally duplicated. It is believed to be particularly useful in cases of institutions, which have multiple key types and which have multiple key duplicating needs throughout a year.

Accordingly, the present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

We claim:

1. A method of making a key, comprising:
    receiving a key identification code indicative of a keyway of an original key, the key identification code being received from a user-portable device; and
    machining the keyway in a duplicate key in response to the identification code.

2. The method as recited in claim 1, wherein the key identification code is also indicative of a key code and further comprising machining the key code in the duplicate key in response to the key identification code.

3. The method as recited in claim 1, wherein receiving the key identification includes receiving the key identification code into a processor via a keyboard.

4. The method as recited in claim 1, wherein receiving the key identification code includes receiving the key identification code into a processor via an optical scanner.

5. The method as recited in claim 1, wherein receiving the key identification code includes receiving the key identification code into a processor via a magnetic scanner that reads the key identification code.

6. The method as recited in claim 1, further comprising obtaining information on the keyway from the original key to form the key identification code.

7. The method as recited in claim 6, wherein obtaining the information on the keyway includes measuring the keyway of the original key.

8. The method as recited in claim 1, further comprising obtaining information from a manufacturer of the original key regarding the keyway and forming the key identification code from the information obtained from the manufacturer.

9. A system for making a key, comprising:
   means for receiving a key identification code indicative of a keyway of an original key, from a user-portable device; and
   means for machining the keyway in a duplicate key in response to the key identification code.

10. The system as recited in claim 9, wherein the key identification code is also indicative of a key code, and further comprising means for machining the key code in response to the key identification code.

11. The system as recited in claim 9, further comprising means for obtaining keyway information from the original key and means for forming the key identification code from the keyway information.

12. A system for making a duplicate key, comprising:
   a processor coupled to an input device adapted to read information from a user-portable device, the processor adapted to receive a key identification code representative of the keyway from the input device; and
   a key machining module, coupled to receive coded instructions from the processor to machine the keyway in the duplicate key in response to the key identification code.

13. The system as recited in claim 12, wherein the key identification code is also representative of a key code and the key machining module is configured to machine the key code in the preform in response to the key identification code.

14. The system as recited in claim 12, wherein the input device is coupled to a keyboard.

15. The system as recited in claim 12, wherein the input device comprises an optical scanner that reads a bar-code representative of the key identification code.

16. The system as recited in claim 12, wherein the input device comprises a magnetic scanner for reading the key identification code in magnetic form.

17. A method of producing a key identification code, comprising:
   obtaining keyway information related to a keyway of a target key;
   producing a key identification code representative of the keyway to be duplicated; and
   outputting the key identification code in a manually portable form to a user.

18. The method as recited in claim 17, wherein obtaining the keyway information includes obtaining the keyway information from the target key.

19. The method as recited in claim 18, wherein obtaining the keyway information from the target key includes measuring the keyway of the target key.

20. The method as recited in claim 17, further comprising obtaining key code information of the target key, and producing the key identification code to be representative of the key code.

21. The method as recited in claim 20, wherein obtaining key code information includes obtaining the key code information from the target key.

22. The method as recited in claim 21, wherein obtaining the key code information from the target key includes measuring the key code of the target key.

23. The method as recited in claim 17, wherein the key identification code includes code indicative of numerical tool paths and machining instructions representative of the keyway to be duplicated in a duplicate key.

24. The method as recited in claim 17, wherein the key identification code includes an identifier of an entry in a keyway database representative of the keyway to be duplicated in a duplicate key.

25. The method as recited in claim 17, wherein outputting the key identification code to the user includes magnetically formatting the key identification code on a magnetic memory.

26. The method as recited in claim 17, wherein outputting key identification code to the user includes printing a bar code.

27. A system of producing a duplicate key identification code, comprising:
   a module adapted to receive target keyway information;
   a processor, coupled to the measuring module to receive target keyway information and to generate a key identification code representative of the target keyway; and
   an output module, coupled to the processor to output the key identification code in a manually portable form to a user.

28. The system as recited in claim 27, wherein the module is adapted to receive the target keyway information from the target key.

29. The system as recited in claim 28, wherein the module is adapted to measure the target keyway.

30. The system as recited in claim 27, wherein the module is adapted to receive key code information and the processor generates the identification code representative of the target keyway and the target key code.

31. The system as recited in claim 30, wherein the module is adapted to receive the key code information from the target key.

32. The system as recited in claim 31, wherein the module is adapted to measure the key code of the target key.

33. The system as recited in claim 27, wherein the key identification code includes numerical tool paths and machining instructions representative of the target keyway.

34. The system as recited in claim 27, wherein the key identification code includes a keyway identification indicative of target keyway information stored in a keyway database.

35. The system as recited in claim 27, wherein the output module is adapted to provide the key identification code to the user in bar code format.

36. The system as recited in claim 27, wherein the output module is adapted to provide the key identification code to the user as a magnetically formatted code.

* * * * *